Oct. 28, 1969

C. L. McCLAREN 3,474,725

ELECTRIC COOKING APPARATUS

Filed May 27, 1968

INVENTOR.
CECIL L. McCLAREN

BY

*Robert E. Brisbois*

ATTORNEY

Oct. 28, 1969  C. L. McCLAREN  3,474,725
ELECTRIC COOKING APPARATUS
Filed May 27, 1968  2 Sheets-Sheet 2

INVENTOR.
CECIL L. McCLAREN
BY
Robert E Breidenthal
ATTORNEY

United States Patent Office 3,474,725
Patented Oct. 28, 1969

3,474,725
ELECTRIC COOKING APPARATUS
Cecil L. McClaren, 257 S. Minneapolis,
Wichita, Kans. 67211
Filed May 27, 1968, Ser. No. 732,330
Int. Cl. A47j 37/08
U.S. Cl. 99—400        11 Claims

ABSTRACT OF THE DISCLOSURE

Electric cooking apparatus including a generally frusto-conical body having a food supporting grid spaced below its upper major end. A domed cover is provided for closing the upper end of the body and for reflecting or directing heat to the upper surface of grid supported food. An electric heater including an electrically resistive heating element is provided in the minor lower end of the body in radially spaced relation thereto for directing radiant heat energy to the upward reflective inner surface of the body. A housing is provided for the electrically resistive heating element which has a top wall upon which hickory chips or other aromatic material can be placed for flavoring purposes, and which housing also includes a perforated wall radially embracing the heating element in spaced relation thereto for the passage of radiant energy and convective air currents therethrough. The top and side wall of the housing is detachably mounted to permit cleaning thereof and/or afford access to the heater element for servicing or replacement thereof. The electric heating element is supported by insulating means in a generally cylindrical configuration coaxial with the perforated side wall. Heat resistant means is provided for electrically connecting electric power leads to the heating element. Means is provided for detachably securing the heater to the lower end of the body, and a drip pan is detachably suspended from the lower end of the body. A support stand is provided including a flat platform having an opening therethrough, and an annular support is mounted on the platform in spaced relation thereto and in alignment with the opening. The body extends through the opening in spaced relation to the platform with the body having an external annular shoulder supportingly engaging the annular member.

---

The present invention relates to new and useful improvements in electric cooking apparatus, and more particularly pertains to such apparatus especially suited for broiling and barbecuing wherein an electric heating unit is disposed in a housing below the grid on which the food is placed in an arrangement such that radiant energy is directed to impinge to a substantial extent upon the underside and also to a considerable extent upon the top of the food, and such that food is enveloped in heated air and aromatic fumes.

In recent years there has been an increasing trend in what has been termed "suburban living" to serve meals out of doors during pleasant weather as a part of family routine or as a part of guest entertainment activities. In large measure, such means are prepared out of doors rather than in the kitchen of residence buildings, this all being in accordance with the desirability of creating a recreational and picnic-like atmosphere in association with the meal. A great variety of cooking apparatus has been proposed and many different types of such apparatus have been marketed to satisfy the public demand for suitable cooking equipment, including units employing charcoal as fuel as well as electric heating units.

The present invention is intended to satisfy the need for outdoor cooking equipment where electric power is available, and also to provide cooking equipment which is additionally suitable for indoor use; such equipment being of such performance, attractiveness and practicality as to be of great utility in the course of normal meal preparation totally apart from considerations such as the establishment of a festive environment.

The instance invention constitutes improvements upon prior proposals such as set forth in U.S. Patent No. 2,943,557, which issued to Suehlsen on July 5, 1960, and U.S. Patent No. 1,963,883, which issued to Brinkmier on June 19, 1934, an understanding of some of the background of the art can be obtained upon considering the disclosures of such patents, such disclosures being incorporated herein by reference.

An important object of this invention is to provide an electric cooker which will enable the rapid cooking of meats and the like with high efficiency of the application of electrical energy to this end, and which will enable the broiling or barbecuing of meat without necessitating the turning of the meat or the attention normally required to attend to the usually required turning operation.

Another important object is to provide an electric cooking unit that can be conveniently removed from a support stand therefor, and which can be readily assembled and disassembled for cleaning or replacement of parts by persons of minimum mechanical skill.

Yet another important object is to provide an electric cooking unit having an electric heater that will efficiently produce hot convective air currents, and which will dissipate a substantial proportion of electrical energy supplied thereto as radiant energy that can be reflected to impinge on the meat being cooked.

Still another important object of the invention is to provide a cooker of the character specified above that will be durable and reliable in use, and which will present no electrical shock hazard to the user and subject such user to a minimum risk of being burned or otherwise being injured.

A broad aspect of the invention involves an electric cooker of the type including an upright substantially frusto-conical body with its minor end lowermost and open, and which cooker includes an electric heating means; the improvement thereof wherein the electric heating means comprises a heater element housing, an electric resistance heater element disposed in said housing, said housing comprising a vertical cylindrical shell having a top wall closing the upper end thereof, means for supporting said element within the housing, said last means including a horizontal base plate, said base plate having a pair of openings therethrough, a pair of feed through electric insulator structures each including a coaxial electric conductor therethrough, said insulator structures being mounted on the base plate to extend respectively along with their coaxial electric conductors through said openings, said electric resistance heater element having two extremities mechanically and electrically respectively connected to the upper ends of the electrical conductors of the feed through insulator structures, with the lower ends of said conductors constituting electric terminals adapted to be connected to electric power leads, said cylindrical shell of the housing being perforate for the passage of air and also for the passage of radiant energy therethrough, and means for internally mounting the base plate and the cylindrical shell upon the frusto-conical body in coaxial and radially spaced relation thereto.

Another broad aspect of the invention involves an electrical heater comprising a base plate having a pair of spaced upstanding support members secured thereto, a pair of vertically spaced annular arrays of annular electric insulators disposed between and carried by the support members, and an elongated electrically resistive heater wire laced alternately upwardly and downwardly through the annular insulators of the pairs of arrays thereof in an arrangement such that the laced wire has a generally hollow cylindrical configuration, said base plate having a pair of openings therethrough, a pair of feed through electric insulator structures each including a coaxial electric conductor therethrough, said insulator structures being mounted on the base plate to extend along with their coaxial electric conductors through said openings, said wire having two extremities respectively secured to the electric conductors adjacent the upper side of the base plate, with the lower ends of the electric conductors constituting electric terminals adapted to be connected to the electric power leads.

Another aspect of the invention set forth in the preceding paragraph comprises a housing for the heater which includes a perforated vertical cylindrical shell surrounding the electric heater, an imperforate top wall closing the upper end of the shell, and said top wall having a peripheral annular drip lip projecting downwardly and outwardly from the upper end of the shelf.

Still another aspect of the invention involves an electric cooker having a generally frusto-conical hollow body having its minor end lowermost and open, an electric heater concentrically received in radially spaced relation within the lower interior of the body, a drip pan disposed in spaced relation below the lower open end of the body, and said body and said drip pan being provided with co-acting means for detachably securing the drip pan to the body in a depending relationship thereto.

An important feature of the invention resides in the configuration of the electrical resistance heating element, the mounting thereof, and the removable housing therefor that includes a top wall upon which may be placed hickory chips or other flavor or aroma generating material.

Another important feature of the invention resides in the manner in which the electrical power leads are connected to the electrical heating element such that such leads are secure against inadvertent physical contact as well as being sheltered against the deleterious effects of heat.

These and other objects, aspects, features and advantages of the instant invention will become manifest during the following description of the invention, such description being given in conjunction with the accompanying drawings illustrative of a preferred embodiment of the invention, wherein.

Figure 1:
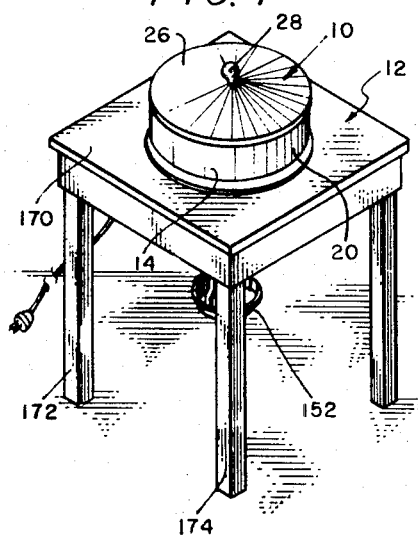
FIGURE 1 is an isometric view of the electrical cooker and a support stand therefor.
Figure 2:
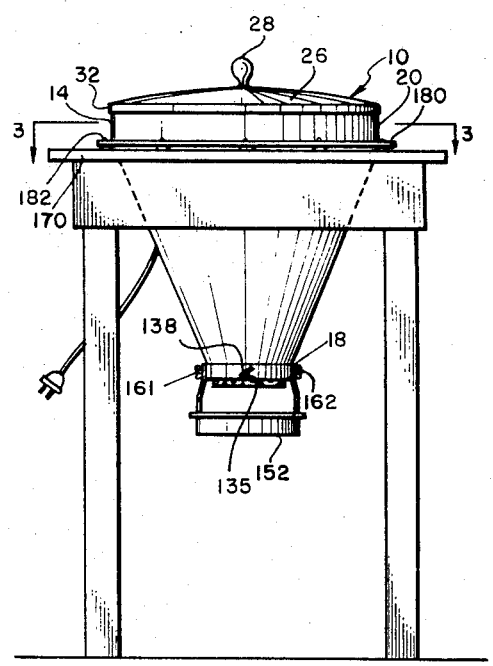
FIGURE 2 is an enlarged side elevational view of the apparatus shown in FIGURE 1, with a hidden portion of the profile of the cooker body being shown in dashed outline.

Referring now to the drawings, wherein like numerals designate like parts throughout the various views, the reference numerals 10 and 12 designate generally, respectively, the cooking unit of this invention and the support stand therefor.

The cooking unit 10 comprises a hollow generally frusto-conical body 14 that includes an intermediate frusto-conical body portion 16 having its major end uppermost, and which merges at its lower end with an integral depending cylindrical body portion 18. As will be evident upon inspection of the drawings, the vertical axial extent of the frusto-conical body portion 16 is much greater than the axial extent of the cylindrical body portion 18. The upper major end of the frusto-conical body portion 16 is integral with an upstanding cylindrical body portion 20, and the diameter of the cylindrical body portion 20 is larger than the diameter of the frusto-conical body portion 16 immediately contiguous thereto in such an arrangement that a downwardly facing external shoulder 22 is defined at the juncture of the body portions 16 and 20, and so that an internal upwardly facing annular shoulder 24 is also defined at the juncture of such body portions 16 and 20. The functions of the annular shoulders 22 and 24 will be presently described.

The reference numeral 26 designates a domed cover for closing the upper end of the hollow body 14, such domed cover 26 being provided with an upstanding central knob 28, preferably of a non-metallic material of low thermal conductivity such as Bakelite, the knob 28 being conventionally attached by means of a threaded fastener 30 extending upwardly through the center of the domed cover 26 and threaded into the knob 28. The domed cover 26 includes a peripheral depending annular rim or flange 32 that embraces the upper peripheral edge of the cylindrical body portion 20 when the cover 26 is removably seated on the body 14 as shown on the drawings.

In the preferred construction, the body 14 and the domed cover 26 therefor are made of metal such as aluminum or stainless steel, and the internal surfaces thereof are preferably polished or in any event given a finish such as to be reflective of radiant or infra-red radiation. Additionally, it is a desideratum of the internal surfaces of the body 14 and the domed cover 26 that they be resistant to staining and easily cleaned.

Figure 3:
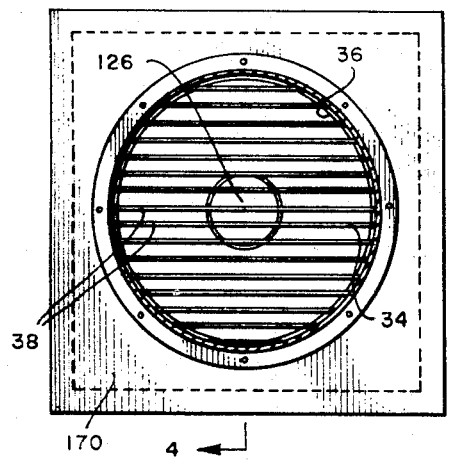
FIGURE 3 is a horizontal sectional view taken upon the plane of the section line 3—3 of FIGURE 2, a portion of the support stand being broken away to reveal hidden structure, and a hidden portion of the stand being shown in dashed outline.

The cooker unit 10 additionally includes a grid or grill 34 removably received within the cylindrical body portion 20, such grid 34 being of circular configuration and having a diameter such as to engage and rest upon the previously described internal, upwardly facing annular shoulder 24. The grid 34 can be conveniently comprised of a circular stainless steel rod 36, to which the opposite extremities of a plurality of parallel stainless steel rods are welded. As clearly shown in FIGURE 3, the rods 38 are spaced substantially from each other, particularly with respect to the diameters of such rods in such an arrangement that the grid 34 constitutes a minor obstruction as to free passage of air and radiant energy therethrough for a purpose to be presently described. The grid 34 can, of course, be made of other materials such as steel plated with nickel, for example.

The cooker unit 10 additionally includes an electric heater unit designated generally at 40. The electric heater unit 40 comprises a generally cylindrical shell 42, preferably perforated as indicated at 44, such cylindrical shell 42 having its upper end closed by an end wall or base plate 46. Preferably the base plate 46 is formed integrally with the cylindrical shell, but may be welded or otherwise fixedly secured thereto by any suitable means. The lower end of the perforated cylindrical shell 42 is closed by a bottom wall 48 that is detachably secured thereto by means of cap screws or the like 50 that extend through the bottom wall 48 and are threadingly engaged with an inturned flange 52 at the lower end of the cylindrical shell 42.

For a purpose presently to be explained, the cylindrical shell 42 is at a position intermediate its vertical extent formed to include a radial enlargement or annular bead 54 about its circumference.

A pair of upstanding arms or supports 56 and 58 are mounted upon the base plate 46, the lower ends of the supports 56 and 58 being secured to the base plate 46 by means of threaded fasteners 60 and 62 at positions that are diametrically opposed and closely spaced to the circular outer periphery of the base plate 46.

A generally circularly shaped metallic member 64 is disposed horizontally between the supports 56 and 58 in spaced relation above the base plate 46 and is rigidly attached at diametrically opposed positions 66 and 68 to the supports 56 and 58. The member 64 at circumferentially spaced positions is attached to and embraces an even number of annular electrical insulators such as those indicated at 70. The arrangement is such that the circumferentially spaced electrical annular insulators 70 mounted upon the supports 56 and 58 by the member 64 constitute a circular array of annular insulators. In a similar manner a circular metallic member 72 is disposed horizontally between the supports 56 and 58 at a position spaced substantially above the previously mentioned member 64, and the circular member 72 is attached to and constitutes a mounting for a circular array of annular insulators such as those indicated at 74. The number of annular insulators 74 is equal to the number of annular insulators 70 and is substantially spaced thereabove, and the circular member 72 is fixedly secured as by welding or the like to the supports 56 and 58 as indicated at 76 and 78. For a purpose to be presently explained, the supports 56 and 58 project upwardly above the positions of their attachment to the member 72.

Figure 6:
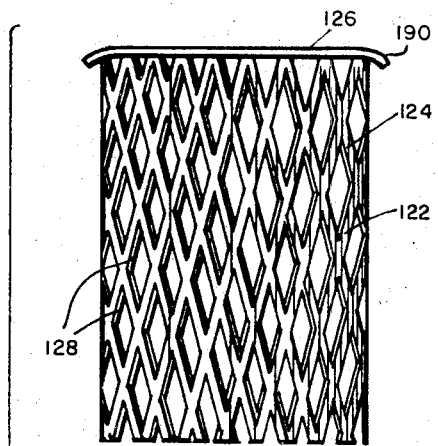
FIGURE 6 is an enlarged and exploded elevational view of the electrical heating unit, with a portion of the housing structure being broken away.
Figure 7:
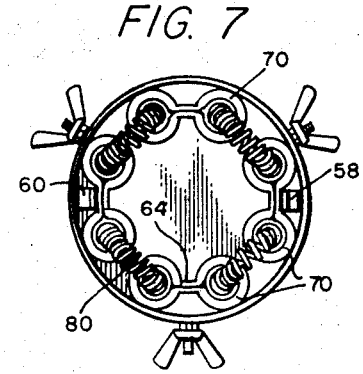
FIGURE 7 is an enlarged top view of the heater unit with the upper portion of the housing thereof removed.
Figure 8:
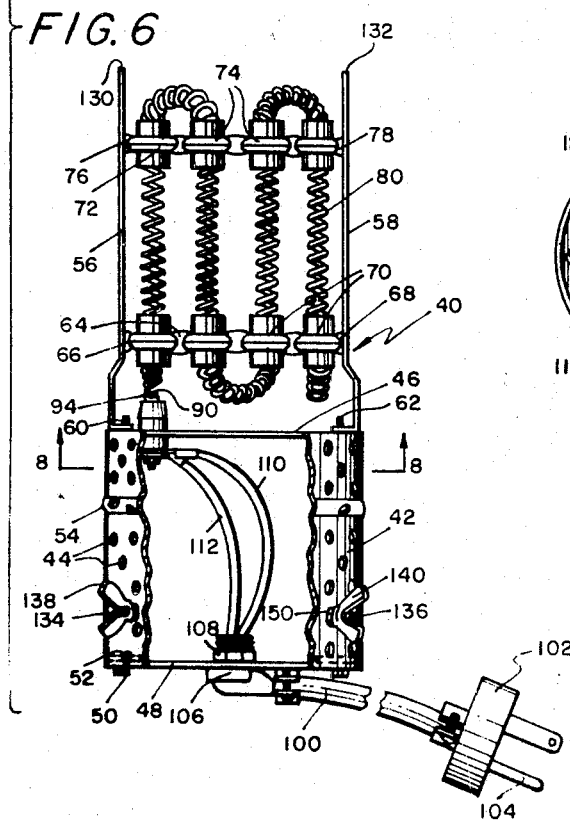
FIGURE 8 is a horizontal sectional view taken upon the plane of the section line 8—8 in FIGURE 6.
Figure 8:
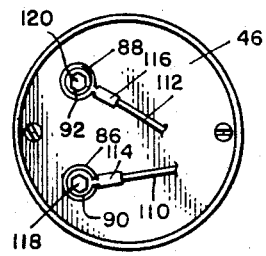

An electrical resistance heating element 80 is provided, the same being laced alternately upwardly and downwardly through the circular arrays of annular insulators 70 and 74, as clearly shown in FIGURES 6 and 7. The electrical heating element 80 is in the form of a helical coil as clearly shown, and the arrangement is such that the overall configuration of the electrical resistance element 80 is conformable to a circular cylinder, the latter in turn being coaxial with the previously described cylindrical shell 42 and having an external diameter approximating but somewhat less than the diameter of the cylindrical shell 42. The base plate 46 is provided with a pair of conventional feed through electrical insulators 86 and 88 that extend vertically therethrough. The feed through electrical insulators 86 and 88 are of conventional character in that each of such electrical insulators 86 and 88 is retained in assembled relation and attached to the base plate 46 by means of an electric conductor or securing bolt extending therethrough such as the electrical conductors 90 and 92 forming a part of the feed through electrical insulators 86 and 88, respectively. The opposite ends of the electrical resistance wire 80 are mechanically and electrically fixed, preferably by brazing or soldering to the upper ends of the combined electrical conductors and fastening means 90 and 92, such as indicated at 94 in relation to the electrical conductor 90 in FIGURE 6.

Means is provided for supplying electrical energy to the electric heating element 80, such means comprising an armoured electric cable 100 provided with a male plug 102 for connection to electric power mains, not shown, at a conventional convenience outlet, also not shown. The plug 102 is preferably of the three-prong type, one prong 104 thereof being a ground wire connection. The armoured cable 100 is terminated at and fixed to an electric conduit adaptor 106 of conventional character, the latter extending through a central opening in the bottom wall 46 and being secured thereto by a nut 108. The armoured electric conduit 100 includes a pair of insulated electric conductors or leads 110 or 112 which extend through the adapter 106 and into the interior of the cylindrical shell 42 in spaced relationship to the latter. The free ends of the electric power leads 110 and 112 are provided with terminal plugs 114 and 116 which are engaged upon the lower ends of the electrical conductors 90 and 92 of the feed through insulators and are mechanically and electrically securely fixed thereto by means of nuts 118 and 120.

The feed through insulators 86 and 88 are preferably of the ceramic or porcelain type such as to withstand high temperatures, and it will be noted that the arrangement is such that the electric power leads 110 and 112 are shielded from inadvertent contact therewith by the shell 42, and that the leads 110 and 112 are in large measure protected against the deleterious effects of heat emanating from the heating element 80 by the imperforate base plate 46, and are afforded a considerable degree of cooling by virtue of the shell 42 being perforated at 44.

Figure 9:
FIGURE 9 is an enlarged vertical sectional detail view illustrating particularly the internal and external annular shoulders of the body.
Figure 9:
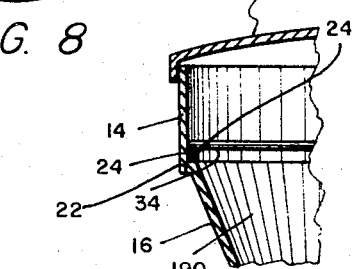
Figure 10:
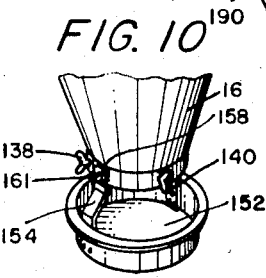
FIGURE 10 is a fragmentary isometric view illustrating the attachment of the drip pan; and, FIGURE 11 is a schematic of the electrical circuit of the heater unit.
Figure 11:
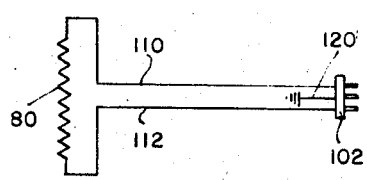

As will be understood, the ground prong 104 of the male plug 102 is electrically grounded to the bottom wall 48 and the adapter 106 as indicated in the schematic diagram of FIGURE 9 at 120. It will be additionally understood that inasmuch as the shell 42, the bottom wall 48, and the standards 56 and 58 are of metal and are electrically conductive, such elements are constrained to be at electrical ground potential and can therefore not constitute an electrical shock hazard. As will be subsequently evident, the electrical heater unit 40 is electrically connected to the other components of the cooking unit 10 so as to prevent any electrical shock hazard to the user.

The basic plate 46 together with the cylindrical shell 42 and a housing structure designated at 122 constitute a housing for the electrical heating element 80. The housing section 122 is comprised of a cylindrical shell 124 having an open lower end, and being of internal diameter slightly in excess of the external diameter of the previously described cylindrical shell 42. The upper end of the cyindrical shell 124 is closed by and fixedly secured to an imperforate top wall or metal disc 126. As readily apparent upon inspection of FIGURE 6, the cylindrical shell or housing side wall 124 is perforated there being a pattern of diamond shaped openings 128 therethrough that are relatively large in their dimensions with respect to the spacing therebetween. The general appearance of the metalic housing side wall 124 is that of what is commonly referred to as expanded sheet metal. While the major dimensions of the openings 128 are shown as being vertical in the drawings, the major dimensions can equally as well be disposed horizontaly. It is believed that horizontal disposition of the major dimensions might be preferable from the standpoint of reducing the cost of attaching the wall 126 to the shell 122. Actually, the openings 128 can be of any desired configuration provided that they constitute a large and preferably a major proportion of the total area of the wall 124.

As clearly shown in FIGURE 7, the wall or disc 126 is of greater diameter than the shell 122 so as to project radially outward therefrom as an annular flange or lip 190 that is inclined downwardly so that any drippings therefrom will fall clear of the shell 122.

The heating element 80 including the supports 56 and 58 therefor as well as the upper end portion of the cylindrical shell 42 are normally received within the upper housing section 122, the portion of the extent of the cylindrical shell 42 above the bead 54 being slidably received within the cylindrical shell 124 is limited by the lower end of the shell 124 coming into engagement with the bead 54, at which time the upper ends 130 and 132 of the supports 56 and 58 engage the top wall 126. Thus the element 80 is positively prevented from coming into contact with the top wall 126 by both the bead 54 and the supports 56 and 58.

Figure 4:
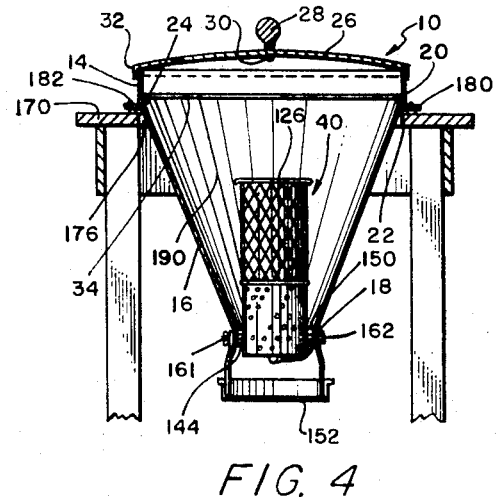
FIGURE 4 is a fragmentary vertical sectional view taken upon the plane of the section line 4—4 in FIGURE 3, with the housing of the electrical heater being shown in elevation.
Figure 5:
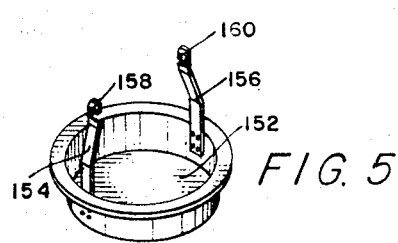
FIGURE 5 is an enlarged isometric view of the drip pan.

The cylindrical shell 42 adjacent its lower end is provided with a plurality of radially outwardly extending threaded rods, preferably three in number spaced 120 degrees apart, such as those indicated at 134 and 136. The lower cylindrical body portion 18 of the body 14 is provided with circumferentially spaced vertical slots 135 opening through the lower end thereof, not shown, for accommodating radially outward projection of the rods such as those indicated at 134 and 136 therethrough. Wing nuts such as those indicated at 138 and 140 are threaded upon the rods 134 and 136 so as to bear against the outer surface of the cylindrical body portion 18 and so as to detachably retain the heater unit 40 in the assembled relation shown thereof in FIGURE 4. It will be understood that the nuts 134 and 136 can be loosened, whereupon the unit 40 can be lowered through the cylindrical body portion 18 and entirely detached from the body 14, the previously mentioned slots in the cylindrical body portion 18 accommodating such downward motion of the rods 134 and 136. It is to be expressly noted that the outer diameter of the heater unit 40 is substantially less than that of the internal diameter of the cylindrical body portion 18 so that there is an annular spacing 144 therebetween. In order to assure concentricity or coaxial alignment of the body 14 and the unit 40, spacers, such as the nut 150, may be placed on the threaded rods such as those indicated at 134 and 136 in an arrangement such that the nuts 150 engage the inner surface of the cylindrical body portion 18 when the cooking unit 10 is assembled.

Means is provided for collecting any drippings that may fall from the interior of the body 14 during the use of the cooker 10, and such means comprises a drip pan 152 spaced below the lower end of the cylindrical body portion 18, the latter being of smaller diameter than the drip pan 152. The drip pan 152 is detachably secured to the body 14 by means of upstanding support arms 154 and 156, and the upper ends of the arms 154 and 156 are provided with L-shaped slots 158 and 160, respectively, which are engageable with outwardly extending ears 158 and 160 on the opposite sides of the cylindrical body portion 18. Conveniently, the radially outward extending ears 161 and 162 can be outwardly struck tabs of the material of the cylindrical body portion 18. As will be noted on inspection of FIGURE 3, the L-shaped slots 158 and 160 appear opposite facing as viewed in such drawing, and it will be therefore evident to those skilled in the art and having any familarity with bayonet-type detachable securing means that the drip pan can be secured to the ears 161 and 162 by turning the drip pan 152 in a clockwise direction so as to engage the ears 161 and 162 into the L-shaped or bayonet-type slots 158 and 160.

The stand 12 includes a horizontal top 170 supported by a plurality of legs such as those indicated at 172 and 174, and the top or platform 170 is provided with a circular opening 176 therethrough for receiving the cooker unit 10. In order to prevent direct contact of the cooker unit 10 with the top or platform 170, a ring or annular member 180 is mounted on the platform 170 in spaced relation thereto by means of a plurality of fasteners and spacers such as indicated at 182. As clearly shown in the drawings the ring 180 is coaxial with the opening 176, and the internal diameter of the ring or annular member 180 is such as to be engaged by the previously mentioned downwardly facing external shoulder 22, whereby the cooking unt 10 is detachably supported upon the ring 180 and thence supported in spaced relation upon the top 170 of the stand 12. It will be appreciated that such arrangement reduces the temperatures to which the top 170 may be subjected, and additionally that such arrangement lessens any likelihood of the top 170 to become soiled by contact with the unit 10. It will be noted that the radial annular spacing between the top 170 and the body 14 together with the spacing of the ring 180 above the top 170 affords a path for convection currents of air from below the top 170 to above the latter. In other words, air ambient to and heated by the lower part of the body 14 is free to rise through annular space between the top 170 and the body 14, thence to pass radially outwardly between the ring 180 and the top 170, and finally to move upwardly of the unit 10 and the supporting stand.

The use of the cooking unit 10 will be readily understood. With the domed cover 26 and the grid 34 removed, hickery chips or any other suitable material generative of aromatic fumes are placed on the top 126 of the cylindrical shell 124, and the grid 34 replaced. The male plug 102 is coupled to any suitable convenience outlet and the meat to be broiled or cooked is placed on the grid 34. The meat food may be of any character, such as spare ribs, hamburger patties, steaks or the like, and such seasoning including flavoring sauces such as to obtain a barbecue-type final product is applied to the meat. The cover 26 is replaced and sufficient time is allowed to elapse for the meat to be cooked to the degree desired. Obviously, the cover 26 may be removed from time to time for further applications if thought desirable to the meat undergoing cooking.

It has been found during actual tests of a working model of the illustrated and described form of the invention that the cooking process requires very little time, an interval of about 7 to about 9 minutes being adequate to obtain moderately well done hamburger patties when the heating element 80 is such as to consume about 8.3 watts. The actual working model of the cooker unit 10 had a maximum diameter of 16 inches and an overall height of the body 14 of about 16 inches. The maximum diameter of the heating unit 40 was about 5 inches.

During the course of cooking the meat, the hickory chips or the like placed on the top wall 126 of the cylindrical shell 124 results in the generation of aromatic materials which tend to accumulate in the upper portion of the interior of the cooker 10 and thereby impart flavor to the meat during the cooking process.

Any drippings of fat or the like that may result during the cooking process drain for the most part from the interior of the body 14 through the lower open end of the same into the drip pan 152, the relatively minor proportion falling upon the top wall 126.

Such grease or fat that may descend or fall upon the top wall 126 tends to flow to the outer periphery of the top wall 126, and it is to be noted that the top wall 126 has a greater diameter than the cylindrical shell 124 so as to project radially outward therefrom, and as indicated at 190, such radiantly outward extending peripheral margin of the top wall 126 is bent downwardly so that grease or fat dripping therefrom will not come into contact with the cylindrical shell 124, but rather will drip directly from the lower end of the housing 14.

When the electrical heating element is energized, air in contact therewith will be raised in temperature and therefore will pass upwardly as a convective air current through the openings or perforations 128 to transfer heat by contact to the meat being cooked. The electrical heating element 80 will emit a very substantial amount of radiant energy, particularly infra-red which passes through the perforations or openings 128 to be reflected upwardly by the inner surfaces of the housing 14 to impinge upon the meat undergoing cooking, and such upwardly directed radiant energy will in part impinge upon and be reflected from the lower surface of the cover 26 to impinge upon the upper surface of the meat being cooked. The combined effect of the convective heating of the meat and the impingement of radiant energy upon the meat being cooked is such as to obtain rapid cooking that is of very nearly the same degree on the top side of the meat as on the lower side thereof. Since the cooking effect is obtained at substantial equal rates with respect to the top side of the meat and the underside of the meat, it has been found in actual practice that there exists very little if any need whatsoever to turn the meat during the cooking process. Such lack of necessity for turning the meat over during the cooking process so as to achieve uniform cooking of the opposite sides of the meat greatly reduces the possibility of improperly cooking or even ruining meat due to lack of attention or the making of frequent inspections, and additionally allows the person conducting the cooking operation to devote his attentions to other matters uninterruptedly for greater intervals than would otherwise be the case, such as to the preparation of salads, and in general devoting a greater degree of attention to the needs of his guests, and the like.

While the invention has been illustrated and described in connection with utilizing electrical energy obtained from the electric mains of a public utility (such as 60 cycle alternating current at 117 or 234 volts) or from a portable self-contained, portable motor-generator set (a gasoline engine and electric generator—A.C. or D.C.— combination); however, the electric heater of the present invention can be such as to operate with appropriate wattage consumption from the direct current output of electric storage batteries, say at 6 or 12 volts, such as is obtainable from conventional automobile storage batteries. It will be noted that the energy storage capacity of conventional automobile storage batteries is sufficiently great to power a 750 watt cooker unit through one or more cooking cycles without recharging. In other words, a cooker of about 750 watts can be coupled to the battery of an automobile and operated for a useful period of time with the automobile engine stopped without discharging the battery to a level insufficient to restart the engine; and with the engine running so as to supply charge (with conventional generator or alternator) to the battery, the cooker can operate substantially continuously. Suitable coupling of the power leads 110 and 112 to the terminals of an automobile storage battery is thought to be well within the skill of the art, and illustration and description of such means is omitted aside from pointing out that the power leads 110 and 112 should be large and of very low ohmic resistance when a low voltage (high current) source of electrical energy is utilized.

It will be obvious to those skilled in the art that the illustrated and described embodiment of the invention is susceptible to numerous variations without departing from the spirit of the invention. The invention has been described in elaborate detail in order to insure a full and complete understanding of the principles involved, and such elaborateness of description should therefore not be construed as inferring any narrowness of scope of the invention. Accordingly, reference must be made to the appended claims in order to ascertain the actual scope of the invention.

I claim:
1. In an electric cooker of the type including an upright substantially frusto-conical body with its minor end lowermost and open, and which cooker includes an electric heating means; the improvement thereof wherein the electric heating means comprises a heater element housing, an electric resistance heater element disposed in said housing, said housisng comprising a vertical cylindrical shell having a top wall closing the upper end thereof, means for supporting said element within the housing, said last means including a horizontal base plate, said base plate having a pair of openings therethrough, a pair of feed through electric insulator structures each including a coaxial electric conductor therethrough, said insulator structures being mounted on the base plate to extend respectively along with their coaxial electric conductors through said openings, said electric resistance heater element having two extremities mechanically and electrically respectively connected to the upper ends of the electrical conductors of the feed through insulator structures, with the lower ends of said conductors constituting electric terminals adapted to be connected to electric power leads, said cylindrical shell of the housing being perforate for the passage of air and also for the passage of radiant energy therethrough, and means for internally mounting the base plate and the cylindrical shell upon the frustoconical body in coaxial and radially spaced relation thereto.

2. The combination of claim 1, wherein the last recited means includes a second vertical cylindrical shell having its upper end closed by and secured to the base plate, the first recited cylindrical shell slidingly and removably receiving into the lower portion thereof the upper end portion of the second cylindrical shell, and means for limiting the extent of the reception of the second shell into the first recited shell.

3. The combination of claim, 2 wherein the means for limiting reception comprises the second shell having an external radial enlargement spaced below the upper end thereof.

4. The combination of claim 2, wherein said means for supporting the heater element additionally includes a pair of spaced upstanding support members having their lower ends secured to the base plate, a pair of vertically spaced annular arrays of annular electric insulators disposed between the support members, and means connecting the annular arrays of insulators to provide support therefor, and said electric heating element being an elongated resistance wire laced alternately upwardly and downwardly through the annular insulators of the pair of arrays thereof in an arrangement such that the laced wire has a generally hollow cylindical configuration.

5. The combination of claim 4, wherein said means for limiting reception comprises at least one of said support means projecting above said arrays of insulators and having an upper end engageable with said top wall of the housing.

6. The combination of claim 1, wherein said top wall has a peripheral margin projecting radially outward from the housing, said margin being inclined downward and constituting a drip lip.

7. The combination of claim 2, wherein the second shell is provided with a plurality of radially extending, circumferentially spaced threaded rods, said body terminating at its lower end in an integral cylindrical section having a plurality of slots therein receiving the threaded rods therethrough, and nuts threaded on the rods in engagement with the cylindrical section.

8. The combination of claim 7, including a bottom wall detachably secured to and closing the lower end of the second cylindrical shell, an electrical conduit mounting adapter secured to the bottom wall and extending through the bottom wall, an electric power conduit connected to the adapter, said conduit including a pair of electric power leads extending upwardly through the adapter and having ends secured to the lower ends of the electric conductors of the feed through insulators.

9. The combination of claim 8, wherein the second shell is perforated to afford connection air cooling of the shell.

10. The combination of claim 1, including a drip pan disposed in spaced relation below the minor end of the body, and said body and said drip pan being provided with coacting means for detachably securing the drip pan to the body in a depending relationship thereto.

11. An improved electric heater comprising a base plate having a pair of spaced upstanding support members secured thereto, a pair of vertically spaced annular arrays of annular electric insulators disposed between and carried by the support members, and an elongated electrically resistive heater wire laced alternately upwardly and downwardly through the annular insulators of the pairs of arrays thereof in an arrangement such that the laced wire has a generally hollow cylindrical configuration, said base plate having a pair of openings therethrough, a pair of feed through electric insulator structures each including a coaxial electric conductor therethrough, said insulator structures being mounted on the base plate to extend along with their coaxial electric conductors through said openings, said wire having two extremities respectively secured to the electric conductors adjacent the upper side of the base plate, with the lower ends of the electric conductors constituting electric terminals adapted to be connected to electric power leads, a housing for said electric heater including a perforated vertical cylindrical shell surrounding said electric heater and removably secured thereto, and imperforate top wall closing the upper end of the cylindrical shell, and said top wall having a peripheral annular drip lip projecting downwardly and outwardly from the upper end of the shell.

References Cited

UNITED STATES PATENTS

| | | | |
|---|---|---|---|
| 2,081,905 | 8/1937 | Bensel et al. | 219—461 |
| 2,634,362 | 4/1953 | Achner | 219—375 X |
| 2,819,375 | 1/1958 | Mohn et al. | 219—366 |
| 2,866,883 | 12/1958 | Borden | 219—260 X |
| 2,894,448 | 7/1959 | Henderson et al. | 99—401 X |
| 3,350,543 | 10/1967 | Berger et al. | 99—446 X |
| 3,413,912 | 12/1968 | Phelan et al. | 99—400 |

VOLODYMYR Y. MAYEWSKY, Primary Examiner

U.S. Cl. X.R.

99—401, 446, 447; 219—385, 400, 375, 366